United States Patent [19]

Berghoff

[11] Patent Number: 4,934,755

[45] Date of Patent: Jun. 19, 1990

[54] BACK REST WITH ADJUSTABLE SHOULDER REST FOR THE SEATS OF MOTOR VEHICLES

[75] Inventor: Hans-Joachim Berghoff, Remscheid-Hasten, Fed. Rep. of Germany

[73] Assignee: Keiper Recaro GmbH & Co., Remscheid, Fed. Rep. of Germany

[21] Appl. No.: 317,736

[22] Filed: Mar. 2, 1989

[30] Foreign Application Priority Data

Mar. 5, 1988 [DE] Fed. Rep. of Germany ....... 3807265

[51] Int. Cl.⁵ ............................................... A47C 7/46
[52] U.S. Cl. ..................................... 297/284; 297/460
[58] Field of Search ................................ 297/284, 460

[56] References Cited

U.S. PATENT DOCUMENTS

| | | | |
|---|---|---|---|
| 4,295,681 | 10/1981 | Gregory | 297/284 |
| 4,313,637 | 2/1982 | Barley | 297/284 |
| 4,469,374 | 9/1984 | Kashihara et al. | 297/284 |
| 4,626,028 | 12/1986 | Hatsutta et al. | 297/284 X |
| 4,709,961 | 12/1987 | Hill | 297/284 |

FOREIGN PATENT DOCUMENTS 2727948  1/1980  Fed. Rep. of Germany ...... 297/284
2356982 11/1980  Fed. Rep. of Germany ...... 297/284

Primary Examiner—Peter A. Aschenbrenner
Attorney, Agent, or Firm—Peter K. Kontler

[57] ABSTRACT

A back rest for the seats of motor vehicles has a frame which carries a relatively short adjustable shoulder support. The sides of the shoulder rest are mounted on pairs of links, and the shoulder rest can be pivoted by two levers each of which is pivotable relative to the frame jointly with one of the links at the respective side of the shoulder rest and is attached to the shoulder rest by a pin-and-slot connection. The levers can be pivoted by reciprocable slides which are mounted on the frame and have followers extending into cam slots of the corresponding levers. The slides can be moved up and down longitudinally of the respective sides of the frame by rack and pinion drives which can be operated by a hand wheel or by a motor. The links cooperate with the levers to impart to the shoulder rest a composite movement including a translatory movement which is superimposed upon a pivotal movement about an imaginary axis located below and remote from the lowermost portion of the shoulder rest. This renders it possible to move the shoulder rest to an infinite number of positions offering comfort to the occupant of the seat.

15 Claims, 3 Drawing Sheets

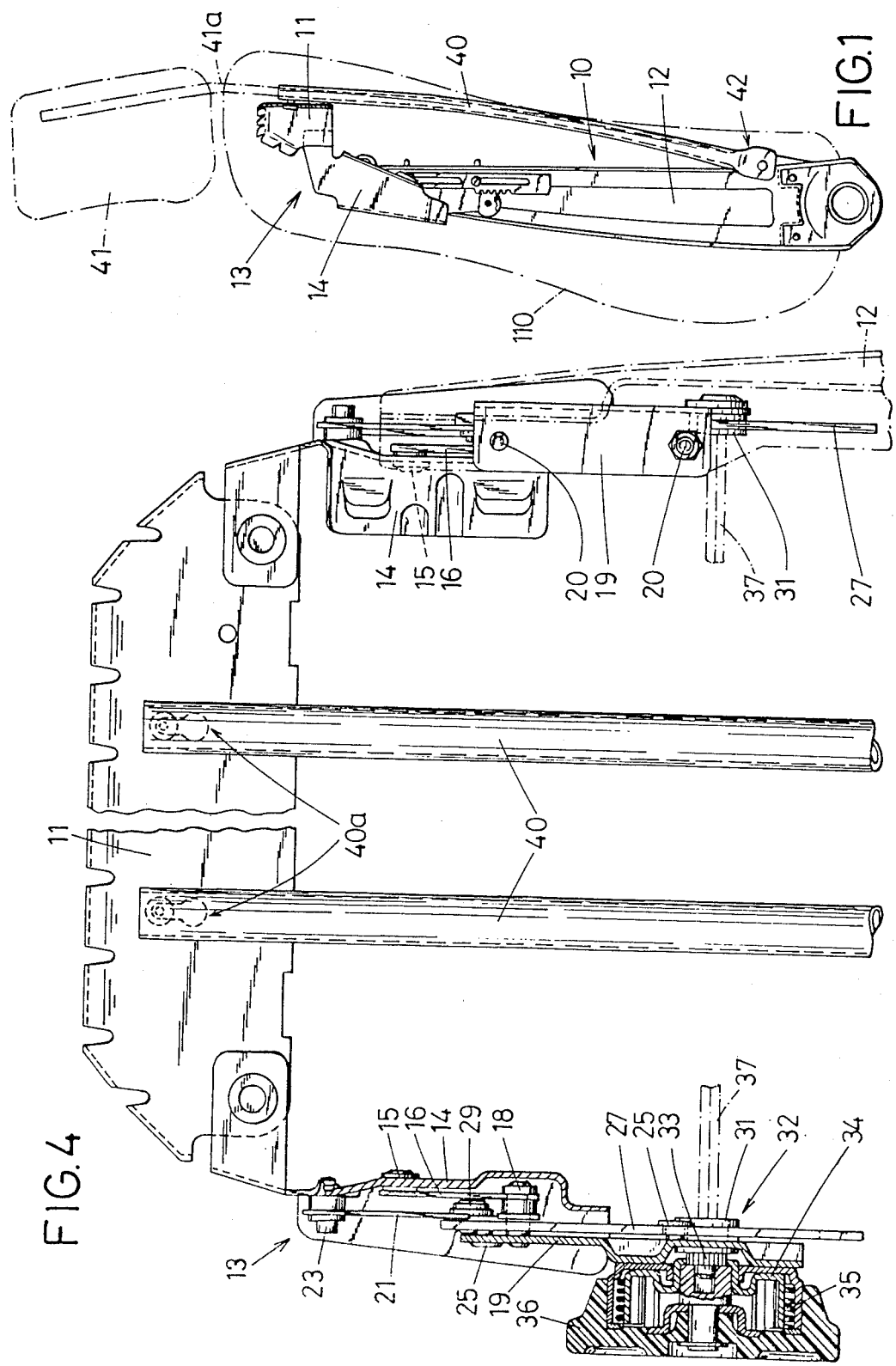

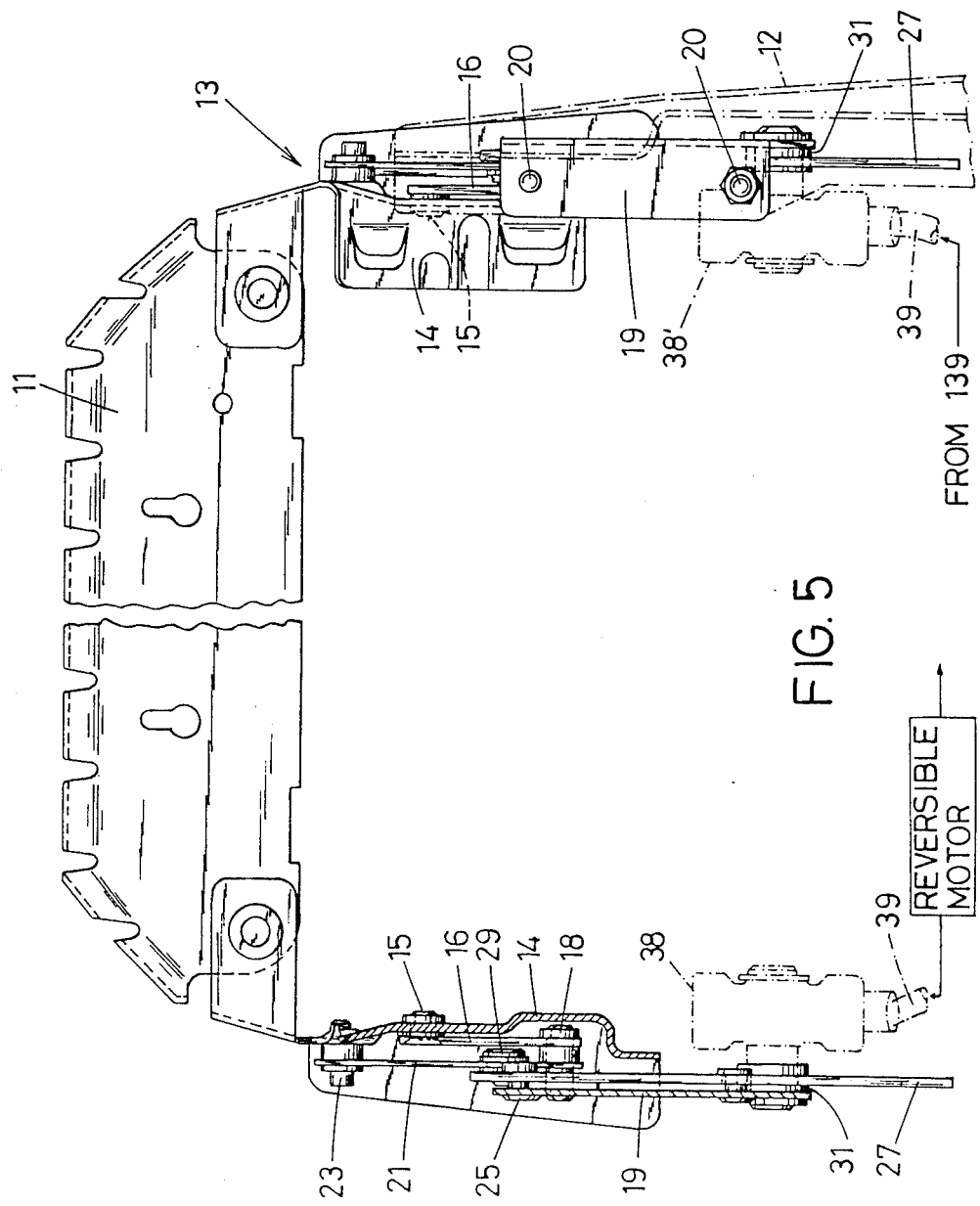

BACK REST WITH ADJUSTABLE SHOULDER REST FOR THE SEATS OF MOTOR VEHICLES

BACKGROUND OF THE INVENTION

The invention relates to seats in general, especially to seats for use in motor vehicles. More particularly, the invention relates to improvements in back rests which can be used with advantage in the seats of motor vehicles. Still more particularly, the invention relates to back rests of the type having adjustable shoulder supports or shoulder rests, namely shoulder-engaging portions which are adjustable with reference to the frames of back rests in order to afford more comfort to the occupants.

German Pat. No. 23 56 982 to Strien et al. discloses a back rest with a relatively short shoulder rest which is pivotally secured to the upper portion of the frame of the back rest. The patented back rest further comprises means for releasably holding the shoulder rest in any one of a rather limited number of different positions. A drawback of the patented back rest is that the distance of the pivot axis from the topmost portion of the shoulder rest is very short. This entails pronounced changes in orientation of the shoulder rest with reference to the frame of the back rest in response to relatively small angular displacements of the shoulder rest about the pivot axis.

German Pat. No. 27 27 948 to Göldner discloses a modified back rest wherein the shoulder rest can be moved to an infinite number of different positions relative to the frame of the back rest. However, the proposal of Göldner exhibits the same drawbacks as that of Strien et al., i.e., the pivot axis for the relatively short shoulder rest is closely adjacent the topmost portion of the shoulder rest so that each pivotal movement of the shoulder rest entails a very pronounced change in orientation relative to the frame of the back rest. It has been found that the solutions which are proposed in the aforediscussed patents are not entirely satisfactory because it can happen that the cushion which overlies the shoulder rests of the patented seats will be in mere linear contact with the shoulders of the occupant in numerous angular positions of the shoulder rest. Such linear contact is uncomfortable to the occupant.

OBJECTS OF THE INVENTION

An object of the invention is to provide a back rest which is equipped with a novel and improved shoulder rest or shoulder support and is constructed and assembled in such a way that the shoulder rest can assume any desired number of positions each of which is comfortable to the occupant of the seat embodying the back rest.

Another object of the invention is to provide a back rest, especially for use in the seats of motor vehicles, with novel and improved means for mounting the shoulder rest on the frame of the back rest and with novel and improved means for changing the orientation of the shoulder rest relative to the frame.

A further object of the invention is to provide a relatively small shoulder rest which can be installed in existing types of back rests to enhance the comfort of the occupant of the seat.

An additional object of the invention is to provide a simple, compact and inexpensive back rest which embodies the above outlined shoulder rest.

Still another object of the invention is to provide a back rest wherein the range of adjustments of the shoulder rest greatly exceeds the ranges of adjustment of shoulder rests in heretofore known back rests.

SUMMARY OF THE INVENTION

The invention is embodied in a back rest for seats, particularly for the seats of motor vehicles. The improved back rest comprises a frame having an upper portion, a shoulder rest which is adjacent the upper portion of the back rest, and means for movably coupling the shoulder rest to the frame. The coupling means comprises substantially parallel links (e.g., two substantially parallel links at each side of the shoulder rest) first pivot means which serve to turnably connect the links to the frame, and second pivot means which serve to turnably connect the links to the shoulder rest. The back rest further comprises means for turning the links about the first pivot means. Such turning means can comprise a lever which is pivotable about the first pivot means, means (e.g., a pin and slot connection) for movably attaching the lever to the shoulder rest, and means for pivoting the lever.

The frame preferably includes two spaced apart substantially upright elongated frame members which flank the shoulder rest, and the pivoting means preferably comprises at least one motion transmitting member which is substantially parallel to the frame members, cam and follower meas serving to connect the motion transmitting member to the lever, and means for moving the motion transmitting member substantially longitudinally of the frame members. The frame members can be provided with bearing elements and the shoulder rest can include extensions (e.g., in the form of substantially Z-shaped brackets) each of which is adjacent one of the bearing elements. The first pivot means can be provided on the bearing elements, and the second pivot means can be provided on the respective extensions. The motion transmitting member can be movably mounted on one of the bearing elements.

The means for moving the motion transmitting member relative to the frame can include a rack and pinion drive. Such drive can include a rack on the motion trasmitting member and a pinion rotatably mounted on one of the frame members and mating with the rack.

One of the frame members preferably comprises guide means defining a predetermined path for movement of the motion transmitting member in response to actuation of the rack and pinion drive. The aforementioned cam and follower means can include a cam slot or groove in the lever and a follower which is provided on the motion transmitting member and extends into the cam slot.

The means for moving the motion transmitting member can further comprise a motor which can actuate the rack and pinion drive or which can be otherwise operatively connected with the motion transmitting member. Still further, the back rest can comprise means for locking the motion transmitting member in a selected position against movement relative to the frame (i.e., for locking the shoulder rest in a selected angular position relative to the frame) when the motor is idle. Such locking means can comprise a worm wheel drive between the motor and the motion transmitting member (e.g., between the motor and the rack and pinion drive for the motion transmitting member).

Alternatively, the moving means can include an input element (e.g., a rotary hand wheel) which is operable by hand to move the motion transmitting member relative to the frame members, and means for locking the motion transmitting member in a selected position. The locking means can include a brake which is interposed between the input element and the motion transmitting member (e.g., between the input element and the rack and pinion drive).

If the pivoting means comprises two motion transmitting members (one at each side of the shoulder rest), and the moving means comprises two rack and pinion drives, one for each of the motion transmitting members, the back rest preferably further comprises a shaft or other suitable means for transmitting torque from the pinion of one of the rack and pinion drives to the pinion of the other rack and pinion drive.

The frame of the back rest can further support an adjustable head rest at a level above the shoulder rest.

The novel features which are considered as characteristic of the invention are set forth in particular in the appended claims. The improved back rest itself, however, both as to its construction and the mode of assembling and operating the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a side elevational view of a back rest which embodies one form of the invention, the cushion and the head rest being indicated by phantom lines and portions of the frame of the back rest being broken away;

FIG. 4 is a front elevational view of the structure which is shown in FIGS. 2 and 3, and further showing a manually operable input element of the means for moving the motion transmitting members relative to the frame; and FIG. 5 shows the structure of FIG. 4 but with motor-driven motion transmitting members.

DESCRIPTION OF PREFERRED EMBODIMENTS

Figure 3:
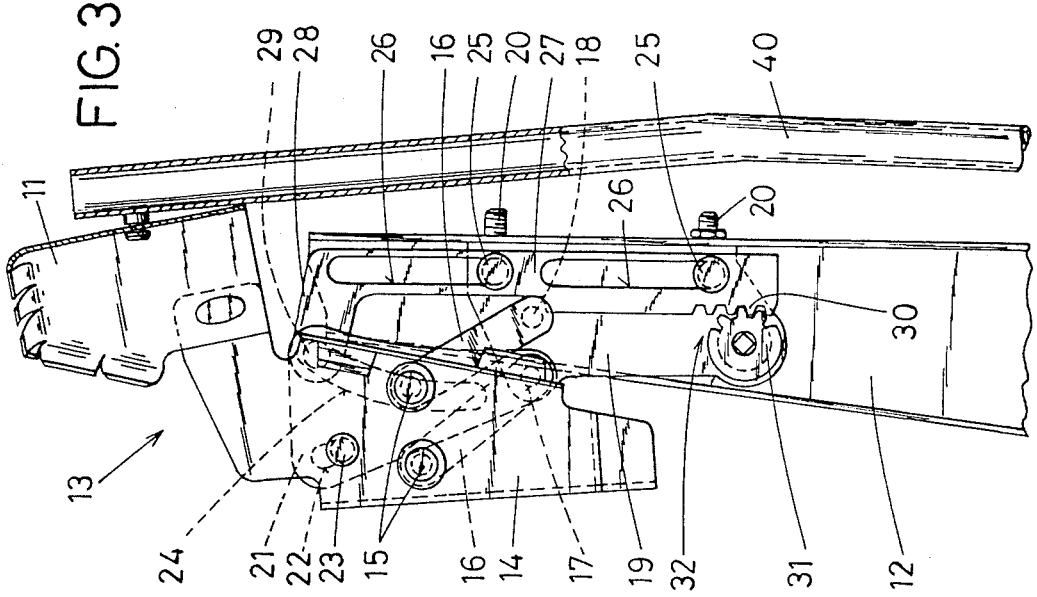
FIG. 3 illustrates the structure of FIG. 2 but with the shoulder rest shown in the other end position with reference to the frame.

The back rest which is shown in FIGS. 1 to 4 comprises a frame 10 including two spaced-apart elongated substantially upright frame members 12 which adjustably carry a novel and improved shoulder support or shoulder rest 13 including a transversely extending frame member 11 between the upper end portions of the frame members 12. The shoulder rest 13 further includes two extensions or brackets 14 each of which has a substantially Z-shaped horizontal cross-sectional outline and extends downwardly from the respective end portion of the transversely extending frame member 11. Each extension 14 is located at a level above and is adjacent a profiled bearing element 19 of the respective frame member 12. Each bearing element 19 has a substantially L-shaped horizontal cross sectional outline and includes a first wall secured to the major portion of the respective frame member 12 by bolt and nut connections 20, and a second wall member which is coupled to the respective extension 14 of the shoulder rest 13 by two substantially parallel links 16. The means for turnably connecting the links 16 to the respective extensions 14 includes pairs of pivots 15, and the means for turnably connecting the links 16 to the respective bearing elements 19 includes pairs of pivots 17, 18.

The means for turning the pairs of links 16 about the respective pairs of pivots 17, 18 to thereby change the inclination of the shoulder rest 13 relative to the frame 10 includes two substantially triangular levers 21 each of which is turnably mounted on the respective pivot 17 and each of which is movably attached to the respective extension 14 by a pin and slot connection 23, 22. In the embodiment of FIGS. 1 to 4, the pins 23 are affixed to the respective extensions 14 and the slots 22 are provided in the corresponding levers 21.

Figure 2:
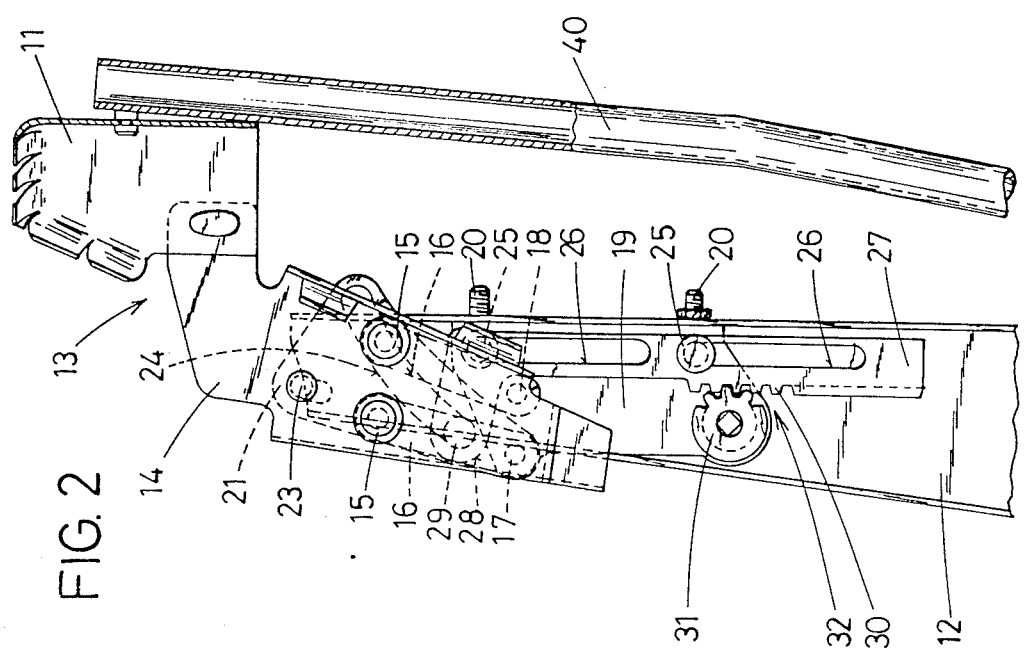
FIG. 2 is an enlarged view of the upper portion of the structure which is shown in FIG. 1, with the head rest omitted and the shoulder rest shown in one of its end positions with reference to the frame of the back rest.

The means for pivoting the levers 21, and for thereby pivoting the shoulder rest 13 relative to the frame 10 through the medium of the two pairs of links 16, includes two elongated motion transmitting members or slides 27 which are mounted for reciprocatory movement longitudinally of the respective frame members 12, cam and follower means 24, 29 which connect the members 27 with the respective levers 21, and means for moving the members 27 relative to the frame members 12. Each cam and follower means comprises an arcuate cam slot or groove 24 in the corresponding lever 21, and a follower 29 which extends into the cam slot 24 and is provided on a forwardly projecting arm 28 at the upper end of the respective motion transmitting member 27. The means for guiding the members 27 during movement relative to the frame members 12 between the two end positions which are shown in FIGS. 2 and 3 includes pairs of elongated slots 26 in the members 27 and pairs of guide posts 25 on the adjacent bearing elements 19. The means for moving the members 27 up and down comprises rack and pinion drives 32 each of which includes a toothed rack 30 on the lower end portion of the corresponding member 27 and a pinion 31 which mates with the rack 30 and is rotatably mounted on the corresponding bearing element 19. The arcuate cam slots 24 are located opposite the slots 22 of the respective levers 21.

The means for moving the motion transmitting members 27 further comprises a manually operable input element 36 in the form of a hand wheel which is rotatably mounted on one of the bearing elements 19 to turn a coaxial stub 33 of the adjacent pinion 31 through the medium of the clutch disc 34 of a locking device here shown as a brake employing a coil spring 35 and serving to lock the shoulder rest 13 in a selected position relative to the frame 10, i.e., to lock the motion transmitting members 27 in selected positions relative to the corresponding bearing elements 19. The illustrated brake including the clutch disc 34 and the torsion spring 35 is integrated into the hand wheel 36 and can be of any conventional design, e.g., of the type disclosed in German Pat. No. 975 780.

In order to avoid the need for two hand wheels 36, the back rest of FIGS. 1 to 4 further comprises a torque transmitting member 37 which serves to rotate the right-hand pinion 31 of FIG. 4 in response to rotation of the left-hand pinion 31 by the hand wheel 36. The member 37 can constitute a shaft having a square or other non-circular cross-sectional outline. It is only necessary to provide the member 37 with non-circular end portions for reception in complementary sockets of the pinions 31.

The frame 10 of the back rest further comprises two tubular carriers 40 of a head rest 41 which is indicated by phantom lines. The head rest 41 has downwardly projecting portions 41a which are slidably telescoped into the upper end portions of the tubular carriers 40 and can be held in selected positions (to maintain the head rest 41 at a desired level) by friction or in any other suitable way. The upper end portions of the carriers 40 are coupled to the transversely extending frame member 11 by pin and slot connections 40a, and the lower end portions of the carriers 40 are coupled to the frame 10 by hinges 42.

When the occupant of the seat embodying the back rest of FIGS. 1 to 4 or another person wishes to change the inclination of the shoulder rest 13 relative to the frame 10 (the shoulder rest 13 is confined in a cushion 110), the hand wheel 36 is rotated in one of the two directions in order to move the motion transmitting members 27 from the positions of FIG. 2 toward the positions of FIG. 3 or vice versa. If the shoulder rest 13 is held in the position of FIG. 2 and is to be moved toward or all the way to the position of FIG. 3, the hand wheel 36 is rotated in a direction to move the members 27 upwardly whereby the hand wheel automatically deactivates the locking means or brake including the clutch disc 34 and torsion spring 35. The torque transmitting member 37 turns the right-hand pinion 31 in synchronism with the left-hand pinion 31 of FIG. 4.

As the motion transmitting members 27 move upwardly, i.e., substantially longitudinally of the respective frame members 12, their followers 29 slide in the cam slots 24 of the respective levers 21 whereby the levers 21 compel the respective links 16 to turn about the corresponding pivots 15, 17 or 15, 18 so that the inclination of the shoulder rest 13 relative to the frame 10 becomes more pronounced. The members 27 pivot the levers 21 in a counterclockwise direction, as seen in FIG. 2. The person in charge can rotate the hand wheel 36 until the shoulder rest 13 reaches a selected position, e.g., the position of FIG. 3 (at such time, the surfaces bounding the upper end portions of the slots 26 in the members 27 abut the respective guide pins 25 on the bearing elements 19 of the frame members 12). The links 16 cause the extensions 14 of the shoulder rest 13 to change their orientation relative to the adjacent bearing elements 19 as long as the hand wheel 36 continues to rotate the pinions 31.

The manner in which the inclination of the entire back rest relative to the body supporting portion of the seat in which the back rest is installed can be changed forms no part of the present invention. Reference may be had to numerous pending United States and other patent applications and numerous United States and foreign patents of the assignee, for example, to U.S. Pats. Nos. 4,563,039, 4,773,704 and 4,786,110.

FIG. 5 shows a portion of a modified back rest wherein all such parts which are identical with or clearly analogous to corresponding parts of the back rest of FIGS. 1 to 4 are denoted by similar reference characters. The difference between the two embodiments of the back rest is that, in FIG. 5, the hand wheel 36 is replaced with a reversible electric or other suitable motor 139 which forms part of the means for moving the motion transmitting members 27 relative to the respective frame members 12. The locking means 34, 35 of FIG. 4 is replaced with two locking means in the form of worm wheel drives 38, 38' which are operatively connected with the motor 139 by flexible shafts 39. One of the worm wheel drives 38, 38' is set up to rotate the respective pinion 31 in a clockwise direction and the other worm wheel drive is set up to rotate the respective pinion in a counterclockwise direction whenever the motor 139 is idle. The self-locking action of the worm drives 38 and 38' suffices to ensure that the motion transmitting members 27 are compelled to remain in selected positions as long as and whenever the motor 139 is idle. The controls for the motor 139 can be mounted on the dashboard of the motor vehicle, on the door adjacent the seat embodying the back rest of FIG. 5, or elsewhere within reach for the person occupying the seat which embodies the back rest of FIG. 5.

An advantage of the improved back rest is that it renders it possible to more readily and more accurately conform the position of the shoulder rest 13 to the requirements or desires of the occupant. Moreover, it is possible to gradually change the inclination of the relatively small shoulder rest 13 because the shoulder rest need not turn about a fixed axis as is customary in heretofore known back rests which are equipped with adjustable shoulder supporting means. All this can be achieved in spite of the fact that the shoulder rest 13 is relatively small, i.e., that it is installed only adjacent the upper portion of the frame 10 of the back rest.

The links 16 cooperate with the levers 21 to impart to the shoulder rest 13 a composite movement including a translatory movement which is superimposed upon a pivotal movement about an imaginary pivot axis. Such imaginary pivot axis is located at a level well below the shoulder rest 13 which renders it possible to change the orientation of the shoulder rest much more gradually than that of a conventional shoulder rest which is pivotally secured to the frame of the back rest for pivotal movement about a fixed axis at the lower end of the shoulder rest. Thus, the distance between the imaginary pivot axis and the shoulder rest 13 of the present invention greatly exceeds the distance between the pivot axis and the topmost portion of a shoulder rest which is mounted in the conventional manner, i.e., which is directly connected to a pivot member in or on the frame of the back rest. The novel back rest renders it possible to gradually change the inclination of the shoulder rest 13 with reference to the frame 10 and to find a position which is more comfortable to the occupant of the seat.

The aforediscussed mounting of the motion transmitting members 27 for movement in substantial parallelism with the elongated frame members 12 of the frame 10 contributes to compactness of the back rest.

The improved back rest is susceptible of many additional modifications without departing from the spirit of the invention. For example, the hand wheel 36 can be replaced with a reversible motor which can drive one of the pinions 31, and the other pinion then receives torque in a manner as shown in FIG. 4 or in any other suitable way. In other words, it is not necessary to provide two discrete locking means (such as the worm wheel drives 38, 38' of FIG. 5), one for each of the rack and pinion drives 32. Still further, the rack and pinion drives 32 can be replaced with other suitable means for moving the members 27 relative to the respective frame members 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A back rest for seats, particularly for the seats of motor vehicles, comprising a frame having an upper portion; a shoulder rest adjacent said upper portion, said frame including first and second frame members flanking said shoulder rest; means for movably coupling said shoulder rest to said frame, including first and second sets of substantially parallel links, first pivot means turnably connecting said sets of links to the respective frame members of said frame, second pivot means turnably connecting said sets of links to said shoulder rest, and a lever movably attached to one of said frame members and to said shoulder rest; and means for turning said sets of links about said first pivot means, including means for pivoting said lever.

2. The back rest of claim 1, wherein said lever is pivotable about one of said first pivot means, said pivoting means being mounted on one of said frame members.

3. A back rest for seats, particularly for the seats of motor vehicles, comprising a frame having an upper portion; a shoulder rest adjacent said upper portion, said frame including two spaced apart substantially upright elongated frame members flanking said shoulder rest; means for movably coupling said shoulder rest to said frame, including substantially parallel links, first pivot means turnably connecting said links to said frame and second pivot means turnably connecting said links to said shoulder rest; and means for turning said links about said first pivot means, including a lever which is pivotable about one of said first pivot means, means for movably attaching said lever to said shoulder rest, and means for pivoting said lever, said pivoting means including at least one motion transmitting member which is substantially parallel to said frame members, cam and follower means connecting said motion transmitting member to said lever, and means for moving said motion transmitting member substantially longitudinally of said frame members.

4. The back rest of claim 3, wherein said frame members include bearing elements and said shoulder rest includes extensions each adjacent one of said bearing elements, said first pivot means being provided on said bearing elements and said second pivot means being provided on said extensions.

5. The back rest of claim 4, wherein said motion transmitting member is movably mounted on one of said bearing elements.

6. The back rest of claim 3, wherein said means for moving said motion transmitting member includes a rack and pinion drive.

7. The back rest of claim 6, wherein one of said frame members includes guide means defining a predetermined path for movement of said motion transmitting member in response to actuation of said rack and pinion drive.

8. The back rest of claim 6, wherein said cam and follower means includes a cam slot in said lever and a follower extending into said cam slot and provided on said motion transmitting member.

9. The back rest of claim 6, wherein said drive includes a rack on said motion transmitting member and a pinion rotatably mounted on one of said frame members and mating with said rack.

10. The back rest of claim 3, wherein said moving means comprises a motor.

11. The back rest of claim 10, further comprising means for locking said motion transmitting member against movement relative to said frame when said motor is idle.

12. The back rest of claim 11, wherein said locking means comprises a worm wheel drive between said motor and said motion transmitting member.

13. The back rest of claim 3, wherein said moving means includes an input element operable by hand to move said motion transmitting member relative to said frame members, and means for locking said motion transmitting member in a selected position.

14. The back rest of claim 13, wherein said input element includes a rotary hand wheel and said locking means includes a brake interposed between said input element and said motion transmitting member.

15. The back rest of claim 3, wherein said pivoting means includes two motion transmitting members each movably mounted on one of said frame members, said moving means comprising a rack and pinion drive for each of said motion transmitting members and means for transmitting torque between the pinions of said drives.

* * * * *